(12) United States Patent
Udo

(10) Patent No.: US 7,952,234 B2
(45) Date of Patent: May 31, 2011

(54) POWER SUPPLY CIRCUIT, POWER SUPPLY CONTROL CIRCUIT AND POWER SUPPLY CONTROL METHOD

(75) Inventor: Shinya Udo, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 773 days.

(21) Appl. No.: 12/027,687

(22) Filed: Feb. 7, 2008

(65) Prior Publication Data

US 2009/0315397 A1    Dec. 24, 2009

(30) Foreign Application Priority Data

Feb. 16, 2007   (JP) .................................. 2007-036281

(51) Int. Cl.
    *H02J 1/00*   (2006.01)
(52) U.S. Cl. ....................................................... 307/86
(58) Field of Classification Search .................... 307/82, 307/85, 86; 323/234; 363/65
    See application file for complete search history.

(56) References Cited

U.S. PATENT DOCUMENTS

| | | | |
|---|---|---|---|
| 6,650,552 B2 * | 11/2003 | Takagi et al. | 363/17 |
| 6,803,892 B2 * | 10/2004 | Roh et al. | 345/87 |
| 7,046,532 B2 * | 5/2006 | Matsuo et al. | 363/65 |
| 7,619,323 B2 * | 11/2009 | Tan et al. | 307/82 |
| 7,773,395 B2 * | 8/2010 | Siri | 363/65 |

FOREIGN PATENT DOCUMENTS

| | | |
|---|---|---|
| JP | 04-289725 A | 10/1992 |
| JP | 2002-369378 A | 12/2002 |
| JP | 2004-282930 A | 10/2004 |
| JP | 2006-204013 A | 8/2006 |

* cited by examiner

*Primary Examiner* — Albert W Paladini
(74) *Attorney, Agent, or Firm* — Arent Fox, LLP

(57) ABSTRACT

A plurality of DC-DC converters are cascade-connected via a plurality of control signal lines which are used in common for start sequence control and stop sequence control. Each of the plurality of DC-DC converters is constituted including a sequence control circuit which commences a start operation along with activation of a control signal line on a previous stage side and activates a control signal line on a subsequent stage side along with completion of the start operation, and commences a stop operation along with deactivation of the control signal line on the subsequent stage side and deactivates the control signal line on the previous stage side along with completion of the stop operation.

10 Claims, 10 Drawing Sheets

US 7,952,234 B2

POWER SUPPLY CIRCUIT, POWER SUPPLY CONTROL CIRCUIT AND POWER SUPPLY CONTROL METHOD

CROSS-REFERENCE TO RELATED APPLICATION

This application is based upon and claims the benefit of priority from Japanese Patent Application No. 2007-036281, filed on Feb. 16, 2007, the entire content of which is incorporated herein by reference.

BACKGROUND

1. Field

The present embodiment relates to a power supply circuit, a power supply control circuit and a power supply control method.

2. Description of the Related Art

In a portable electronics device (such as a notebook type personal computer), a battery is used as a power supply. Generally, since a voltage supplied by a battery becomes lower as discharge of the battery proceeds, a DC-DC converter is mounted in an electronics device for keeping the voltage used in the electronics device constant. Also, along with increase in speed, increase in degree of integration and decrease in power consumption of semiconductor devices, lowering of a power supply voltage in semiconductor devices is in progress, but in an electronics device constituted by combining a plurality of semiconductor devices, a different power supply voltage is often required for each of the semiconductor devices. In such a case, there exist not one type but two or more types of voltages used in the electronics device, and hence the same number of DC-DC converters as the number of types of voltages used in the electronics device are mounted in the electronics device.

Incidentally, when there exists a plurality of voltages used in an electronics device and a power supply circuit using a plurality of DC-DC converters is mounted in the electronics device, there is a risk that latch-up occurs in a semiconductor device which constitutes the electronics device and leads to burn-out if a start sequence and a stop sequence among DC-DC converters is not considered. Accordingly, normally a sequence control circuit which transmits/receives a control signal to/from each of the DC-DC converters is provided in the power supply circuit for controlling the start sequence and the stop sequence between the DC-DC converters.

FIG. 1 shows a first structure example of a power supply circuit. A power supply circuit PWA is constituted including DC-DC converters CNVA1 to CNVA3 which generate output voltages VO1 to VO3 from the input voltage VI, and a sequence control circuit SC which controls start/stop of the DC-DC converters CNVA1 to CNVA3. For example, a rated value for the output voltage VO1 is 5.0 V, a rated value for the output voltage VO2 is 3.0 V, and a rated value for the output voltage VO3 is 1.8 V.

The DC-DC converter CNVA1 makes the output voltage VO1 start to rise in response to a rising transition (transition from a low level to a high level) of a control signal line PON1, and sets a control signal line PGOOD1 to a high level along with completion of rising of the output voltage VO1. Also, the DC-DC converter CNVA1 makes the output voltage VO1 start to fall in response to a falling transition (transition from a high level to a low level) of the control signal line PON1, and sets the control signal line PGOOD1 to a low level along with completion of falling of the output voltage VO1.

The DC-DC converter CNVA2 makes the output voltage VO2 start to rise in response to a rising transition of a control signal line PON2, and sets a control signal line PGOOD2 to a high level along with completion of rising of the output voltage VO2. Also, the DC-DC converter CNVA2 makes the output voltage VO2 start to fall in response to a falling transition of the control signal line PON2, and sets the control signal line PGOOD2 to a low level along with completion of falling of the output voltage VO2.

The DC-DC converter CNVA3 makes the output voltage VO3 start to rise in response to a rising transition of a control signal line PON3, and sets a control signal line PGOOD3 to a high level along with completion of rising of the output voltage VO3. Also, the DC-DC converter CNVA3 makes the output voltage VO3 start to fall in response to a falling transition of the control signal line PON3, and sets the control signal line PGOOD3 to a low level along with completion of falling of the output voltage VO3.

The sequence control circuit SC sets the control signal line PON1 to a high level in response to a rising transition of a control signal line PON. Note that the control signal line PON is set to a high level when requesting a power-on to the power supply circuit PWA, and is set to a low level when requesting a power-off to the power supply circuit PWA. The sequence control circuit SC sets the control signal line PON2 to a high level in response to a rising transition of the control signal line PGOOD1. The sequence control circuit SC sets the control signal line PON3 to a high level in response to a rising transition of the control signal line PGOOD2.

Also, the sequence control circuit SC sets the control signal line PON3 to a low level in response to a falling transition of the control signal line PON. The sequence control circuit SC sets the control signal line PON2 to a low level in response to a falling transition of the control signal line PGOOD3. The sequence control circuit SC sets the control signal line PON1 to a low level in response to a falling transition of the control signal line PGOOD2.

FIG. 2 shows an overview of rising/falling of the output voltages in the power supply circuit of FIG. 1. When the control signal line PON is set to a high level at time t1 (when a power-on is requested to the power supply circuit PWA), the sequence control circuit SC sets the control signal line PON1 to a high level. Accordingly, rising of the output voltage VO1 of the DC-DC converter CNVA1 is started. When the rising of the output voltage VO1 of the DC-DC converter CNVA1 completes at time t2, the DC-DC converter CNVA1 sets the control signal line PGOOD1 to a high level. Along with this, the sequence control circuit SC sets the control signal line PON2 to a high level. Accordingly, rising of the output voltage VO2 of the DC-DC converter CNVA2 is started. When the rising of the output voltage VO2 of the DC-DC converter CNVA2 completes at time t3, the DC-DC converter CNVA2 sets the control signal line PGOOD2 to a high level. Along with this, the sequence control circuit SC sets the control signal line PON3 to a high level. Accordingly, rising of the output voltage VO3 of the DC-DC converter CNVA3 is started. Then, at time t4, the rising of the output voltage VO3 of the DC-DC converter CNVA3 completes.

At time t5, when the control signal line PON is set to a low level (when a power-off is requested to the power supply circuit PWA), the sequence control circuit SC sets the control signal line PO3 to a low level. Accordingly, falling of the output voltage VO3 of the DC-DC converter CNVA3 is started. When the falling of the output voltage VO3 of the DC-DC converter CNVA3 completes at time t6, the DC-DC converter CNVA3 sets the control signal line PGOOD3 to a low level. Along with this, the sequence control circuit SC sets the control signal line PON2 to a low level. Accordingly, falling of the output voltage VO2 of the DC-DC converter CNVA2 is started. When the falling of the output voltage VO2 of the DC-DC converter CNVA2 completes at time t7, the DC-DC converter CNVA2 sets the control signal line PGOOD2 to a low level. Along with this, the sequence control circuit SC sets the control signal line PON1 to a low level. Accordingly, falling of the output voltage VO1 of the DC-DC converter CNVA1 is started. Then, at time t8, the falling of the output voltage VO1 of the DC-DC converter CNVA1 completes.

In the power supply circuit PWA as described above, the sequence control circuit SC is provided for controlling a start sequence and a stop sequence among the DC-DC converters CNVA1 to CNVA3, and it is necessary to provide a large number of control signal lines between the sequence control circuit SC and the DC-DC converters CNVA1 to CNVA3. To decrease the number of control signal lines by eliminating the sequence control circuit, it is conceivable to cascade-connect the DC-DC converters via the control signal lines.

FIG. 3 shows a second structure example of a power supply circuit. A power supply circuit PWB is constituted including DC-DC converters CNVB1 to CNVB3 which generate output voltages VO1 to VO3 from the input voltage VI. For example, a rated value for the output voltage VO1 is 5.0 V, a rated value for the output voltage VO2 is 3.0 V, and a rated value for the output voltage VO3 is 1.8 V.

The DC-DC converter CNVB1 makes the output voltage VO1 start to rise in response to a rising transition of a control signal line PON, and sets a control signal line PGOOD1 to a high level along with completion of rising of the output voltage VO1. Also, the DC-DC converter CNVB1 makes the output voltage VO1 start to fall in response to a falling transition of the control signal line PON, and sets the control signal line PGOOD1 to a low level along with completion of falling of the output voltage VO1. Note that the control signal line PON is set to a high level when requesting a power-on to the power supply circuit PWB, and is set to a low level when requesting a power-off to the power supply circuit PWB.

The DC-DC converter CNVB2 makes the output voltage VO2 start to rise in response to a rising transition of a control signal line PGOOD1, and sets a control signal line PGOOD2 to a high level along with completion of rising of the output voltage VO2. Also, the DC-DC converter CNVB2 makes the output voltage VO2 start to fall in response to a falling transition of the control signal line PGOOD1, and sets the control signal line PGOOD2 to a low level along with completion of falling of the output voltage VO2.

The DC-DC converter CNVB3 makes the output voltage VO3 start to rise in response to a rising transition of a control signal line PGOOD2, and sets a control signal line PGOOD3 to a high level along with completion of rising of the output voltage VO3. Also, the DC-DC converter CNVB3 makes the output voltage VO3 start to fall in response to a falling transition of the control signal line PGOOD2, and sets the control signal line PGOOD3 to a low level along with completion of falling of the output voltage VO3.

FIG. 4 shows an overview of rising/falling of the output voltages in the power supply circuit of FIG. 3. When the control signal line PON is set to a high level at time t1 (when a power-on is requested to the power supply circuit PWB), rising of the output voltage VO1 of the DC-DC converter CNVB1 is started. When the rising of the output voltage VO1 of the DC-DC converter CNVB1 completes at time t2, the DC-DC converter CNVB1 sets the control signal line PGOOD1 to a high level. Accordingly, rising of the output voltage VO2 of the DC-DC converter CNVB2 is started. When the rising of the output voltage VO2 of the DC-DC converter CNVB2 completes at time t3, the DC-DC converter CNVB2 sets the control signal line PGOOD2 to a high level. Accordingly, rising of the output voltage VO3 of the DC-DC converter CNVB3 is started. Then, at time t4, the rising of the output voltage VO3 of the DC-DC converter CNVB3 completes.

At time t5, when the control signal line PON is set to a low level (when a power-off is requested to the power supply circuit PWB), falling of the output voltage VO1 of the DC-DC converter CNVB1 is started. When the falling of the output voltage VO1 of the DC-DC converter CNVB1 completes at time t6, the DC-DC converter CNVB1 sets the control signal line PGOOD1 to a low level. Accordingly, falling of the output voltage VO2 of the DC-DC converter CNVB2 is started. When the falling of the output voltage VO2 of the DC-DC converter CNVB2 completes at time t7, the DC-DC converter CNVB2 sets the control signal line PGOOD2 to a low level. Accordingly, falling of the output voltage VO3 of the DC-DC converter CNVB3 is started. Then, at time t8, the failing of the output voltage VO3 of the DC-DC converter CNVB3 completes.

As described above, in the power supply circuit PWB constituted by simply cascade-connecting the DC-DC converters CNVB1 to CNVB3 via the control signal lines, the start sequence and the stop sequence among the DC-DC converters CNVB1 to CNVB3 become the same. The control of the start sequence and the stop sequence among the DC-DC converters aims at prevention of latch-up or the like in a semiconductor device which uses the output voltage of the DC-DC converter, and thus it is required that the start sequence and the stop sequence among the DC-DC converters are in reverse as in the power supply circuit PWA (FIG. 2). Therefore, the control of the start sequence and the stop sequence between the DC-DC converters CNVB1 to CNVB3 realized by the power supply circuit PWB makes no sense.

FIG. 5 shows a third structure example of a power supply circuit. A power supply circuit PWC is constituted including DC-DC converters CNVC1 to CNVC3 which generate output voltages VO1 to VO3 from the input voltage VI. For example, a rated value for the output voltage VO1 is 5.0 V, a rated value for the output voltage VO2 is 3.0 V, and a rated value for the output voltage VO3 is 1.8 V.

The DC-DC converter CNVC1 makes the output voltage VO1 start to rise in response to a rising transition of a control signal line PON, and sets a control signal line PGOOD1 to a high level along with completion of rising of the output voltage VO1. Note that the control signal line PON is set to a high level only for a predetermined time when requesting a power-on to the power supply circuit PWC. Also, the DC-DC converter CNVC1 makes the output voltage VO1 start to fall in response to a falling transition of the control signal line PGOOD2, and sets the control signal line PGOOD1 to a low level along with completion of falling of the output voltage VO1.

The DC-DC converter CNVC2 makes the output voltage VO2 start to rise in response to a rising transition of a control signal line PGOOD1, and sets a control signal line PGOOD2 to a high level along with completion of rising of the output voltage VO2. Also, the DC-DC converter CNVC2 makes the output voltage VO2 start to fall in response to a falling transition of the control signal line PGOOD3, and sets the control signal line PGOOD2 to a low level along with completion of falling of the output voltage VO2.

The DC-DC converter CNVC3 makes the output voltage VO3 start to rise in response to a rising transition of a control signal line PGOOD2, and sets a control signal line PGOOD3 to a high level along with completion of rising of the output voltage VO3. Also, the DC-DC converter CNVC3 makes the output voltage VO3 start to fall in response to a falling transition of a control signal line POFF, and sets the control signal line PGOOD3 to a low level along with completion of falling of the output voltage VO3. Note that the control signal line POFF is set to a low level only for a predetermined time when requesting a power-off to the power supply circuit PWC.

In the power supply circuit PWC as described above, by cascade-connecting the control signal line for controlling the start sequence and the control signal line for controlling the stop sequence separately among the DC-DC converters CNVC1 to CNVC3, the start sequence and the stop sequence among the DC-DC converters CNVC1 to CNVC3 can be reversed, similarly to the power supply circuit PWA (FIG. 2). However, since it is necessary to provide the control signal line for controlling the stop sequence separately from the control signal line for controlling the start sequence, the object to decrease the number of control signal lines is not achieved. As described above, to realize a desired start sequence and a desired stop sequence among a plurality of DC-DC converters, it has been necessary to provide a large-scale, complicated control circuit and a large number of control signal lines.

Note that as prior arts related to the present embodiment, for example, there are Japanese Unexamined Patent Application Publication No. Hei04-289725 and Japanese Unexamined Patent Application Publication No. 2002-369378.

SUMMARY

A power supply circuit comprising a plurality of DC-DC converters, wherein:

In one aspect of the embodiment, a power supply circuit is constituted including a plurality of DC-DC converters. The plurality of DC-DC converters are cascade-connected via a plurality of control signal lines which are used in common for start sequence control and stop sequence control. Each of the plurality of DC-DC converters is constituted including a sequence control circuit. The sequence control circuit commences a start operation along with activation of a control signal line on a previous stage side and activates a control signal line on a subsequent stage side along with completion of the start operation, and commences a stop operation along with deactivation of the control signal line on the subsequent stage side and deactivates the control signal line on the previous stage side along with completion of the stop operation.

DETAILED DESCRIPTION OF THE EMBODIMENTS

Hereinafter, embodiments will be described using the drawings.

Figure 1:
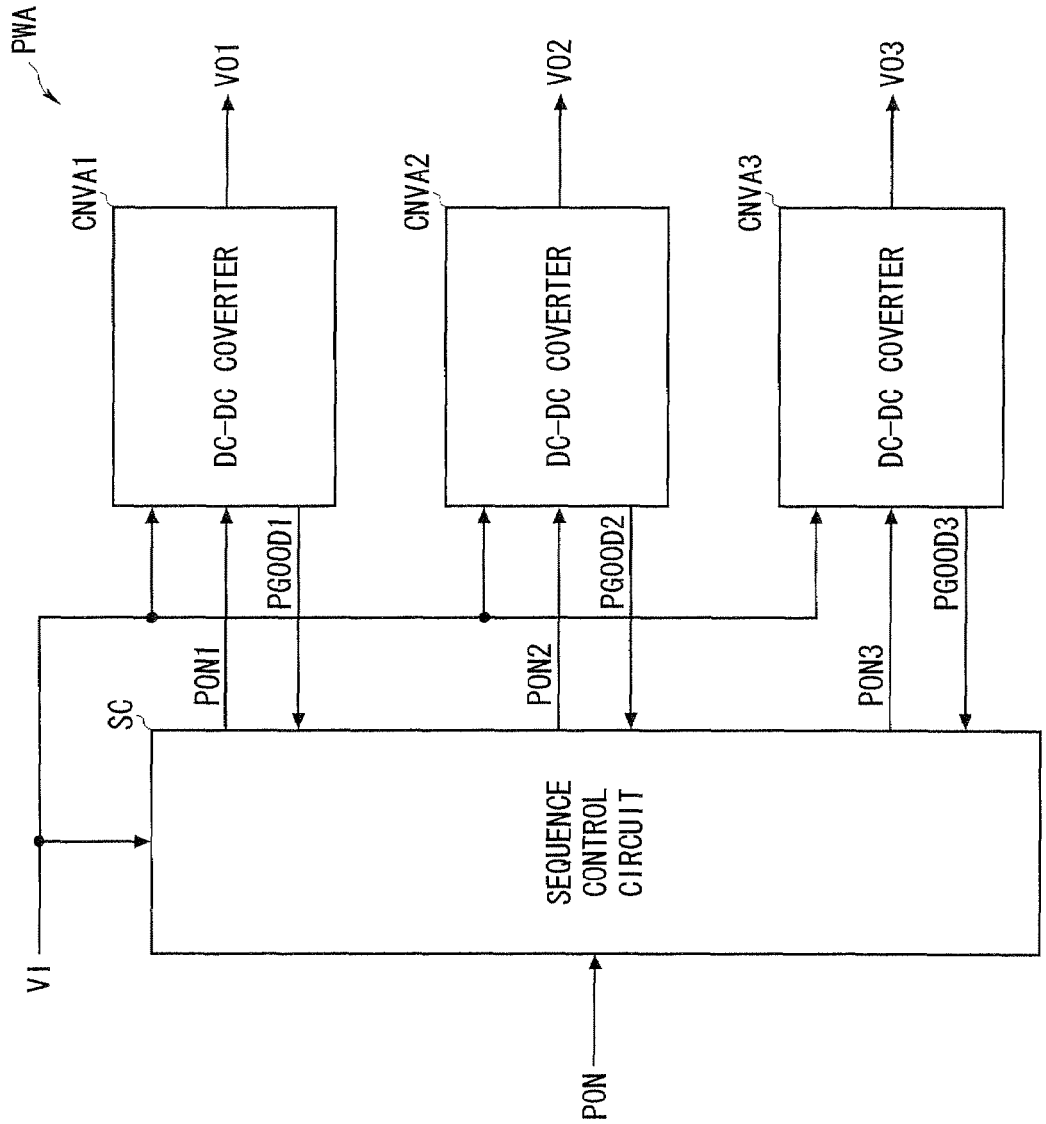
FIG. 1 is an explanatory diagram showing a first structure example of a power supply circuit.
Figure 2:
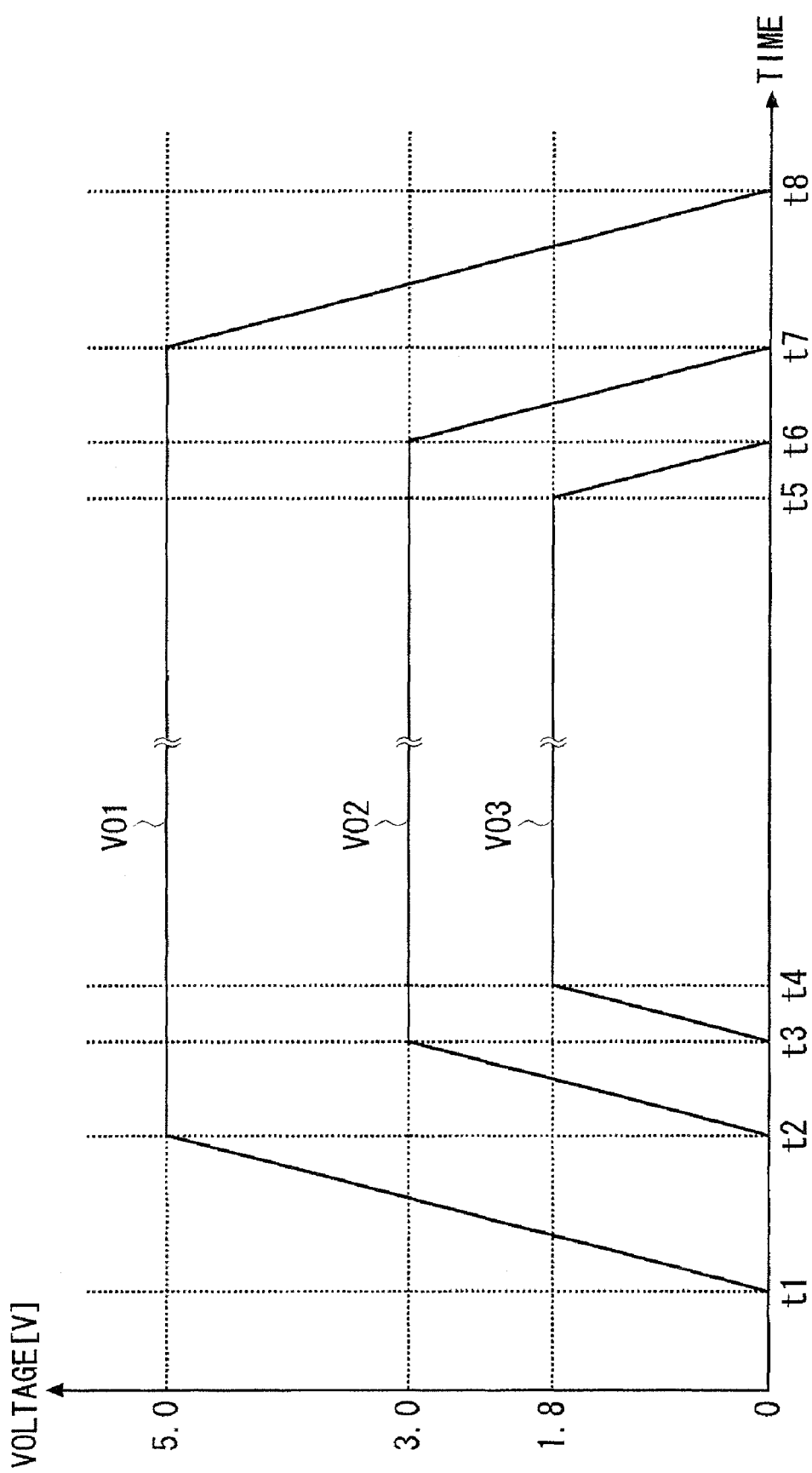
FIG. 2 is an explanatory chart showing an overview of rising/falling of output voltages of the power supply circuit of FIG. 1.
Figure 3:
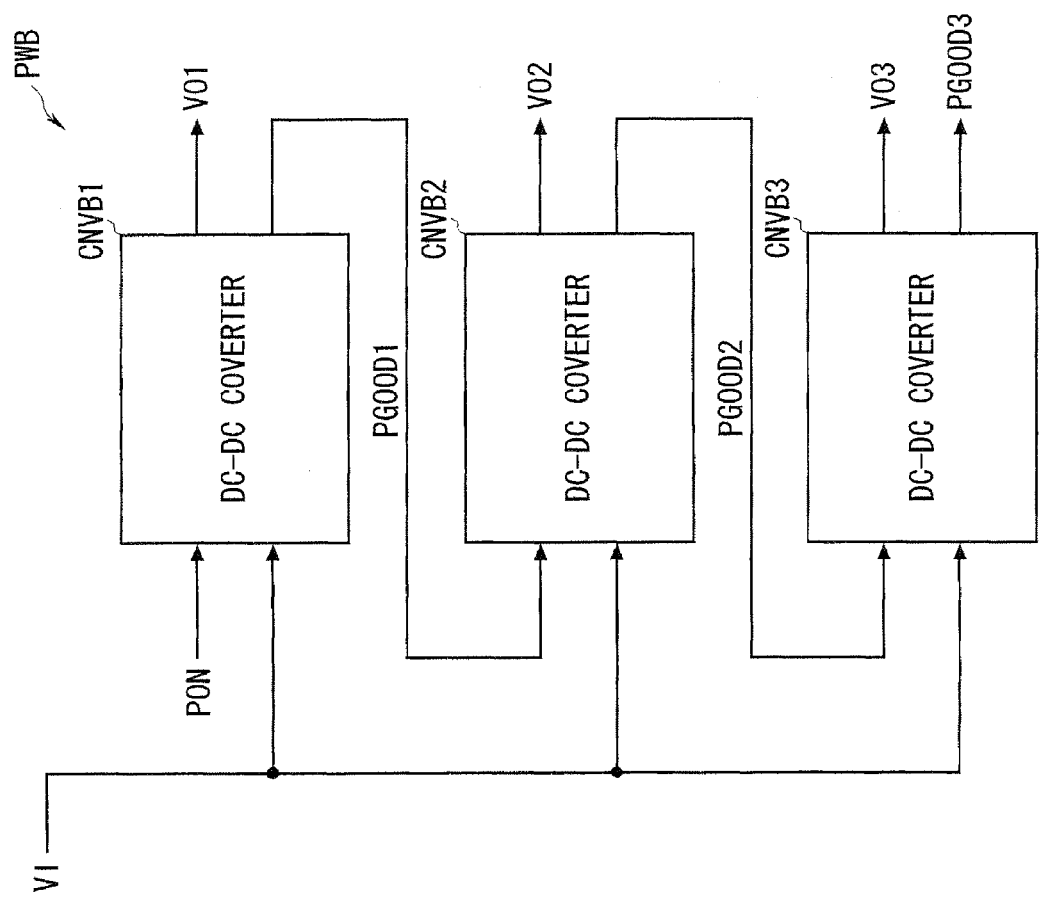
FIG. 3 is an explanatory diagram showing a second structure example of a power supply circuit.
Figure 4:
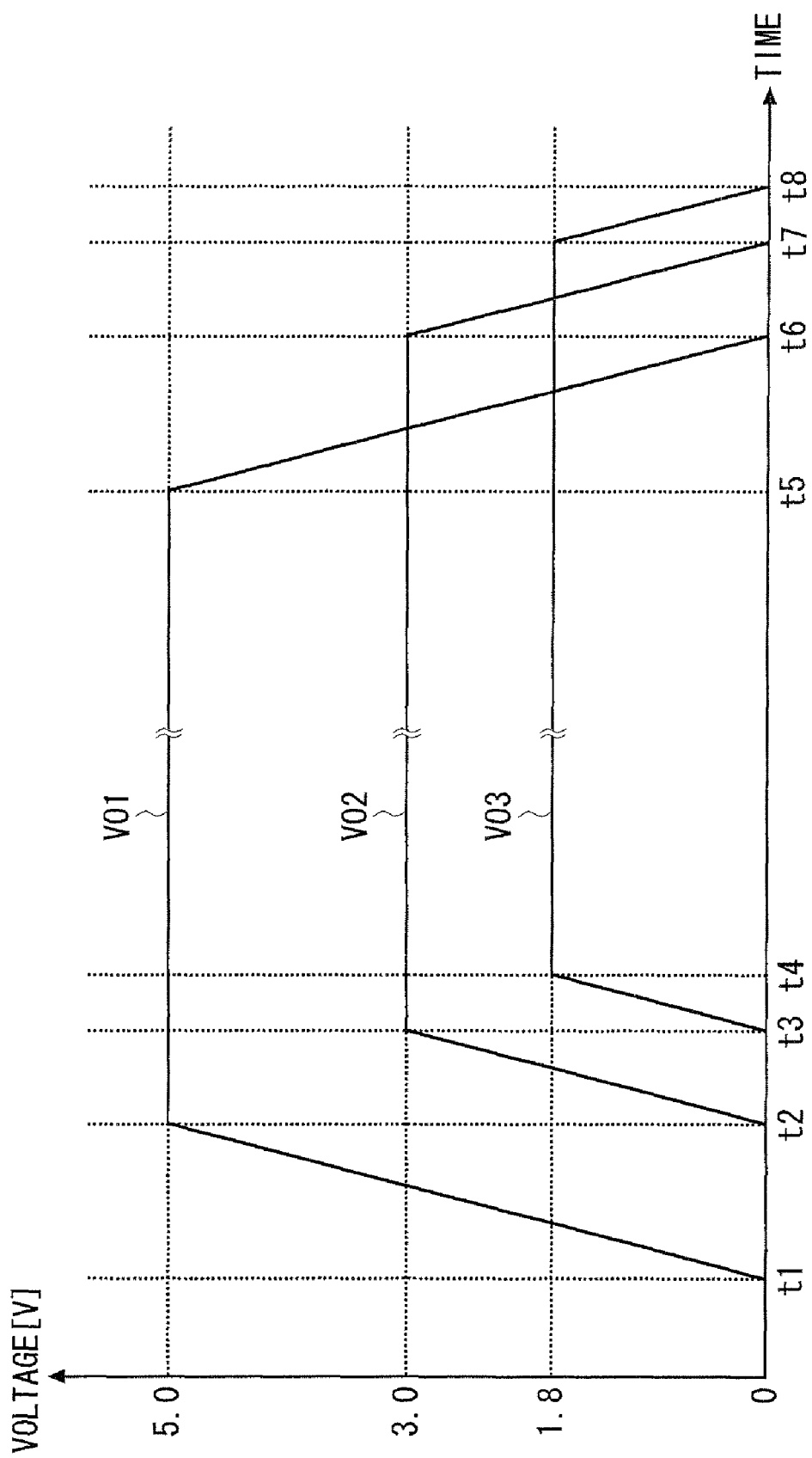
FIG. 4 is an explanatory chart showing an overview of rising/falling of output voltages of the power supply circuit of FIG. 3.
Figure 5:
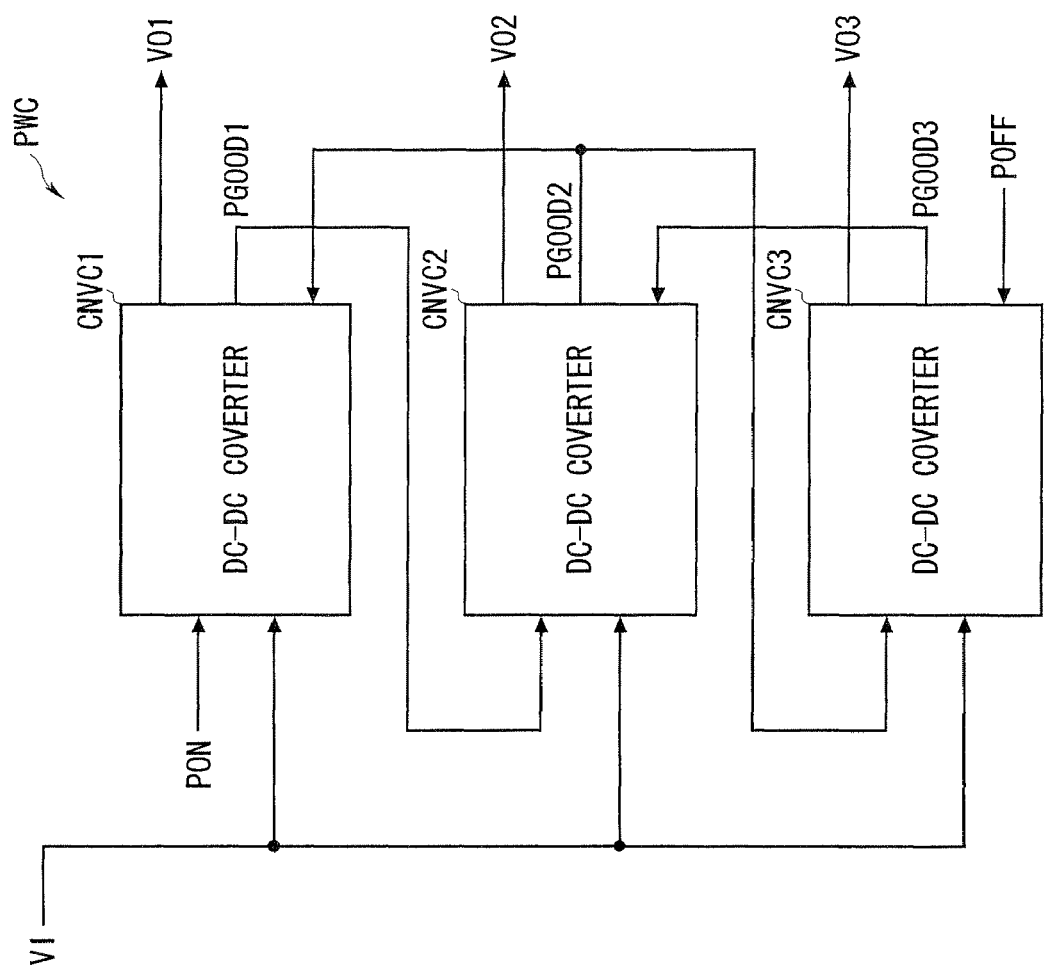
FIG. 5 is an explanatory diagram showing a third structure example of a power supply circuit.
Figure 6:
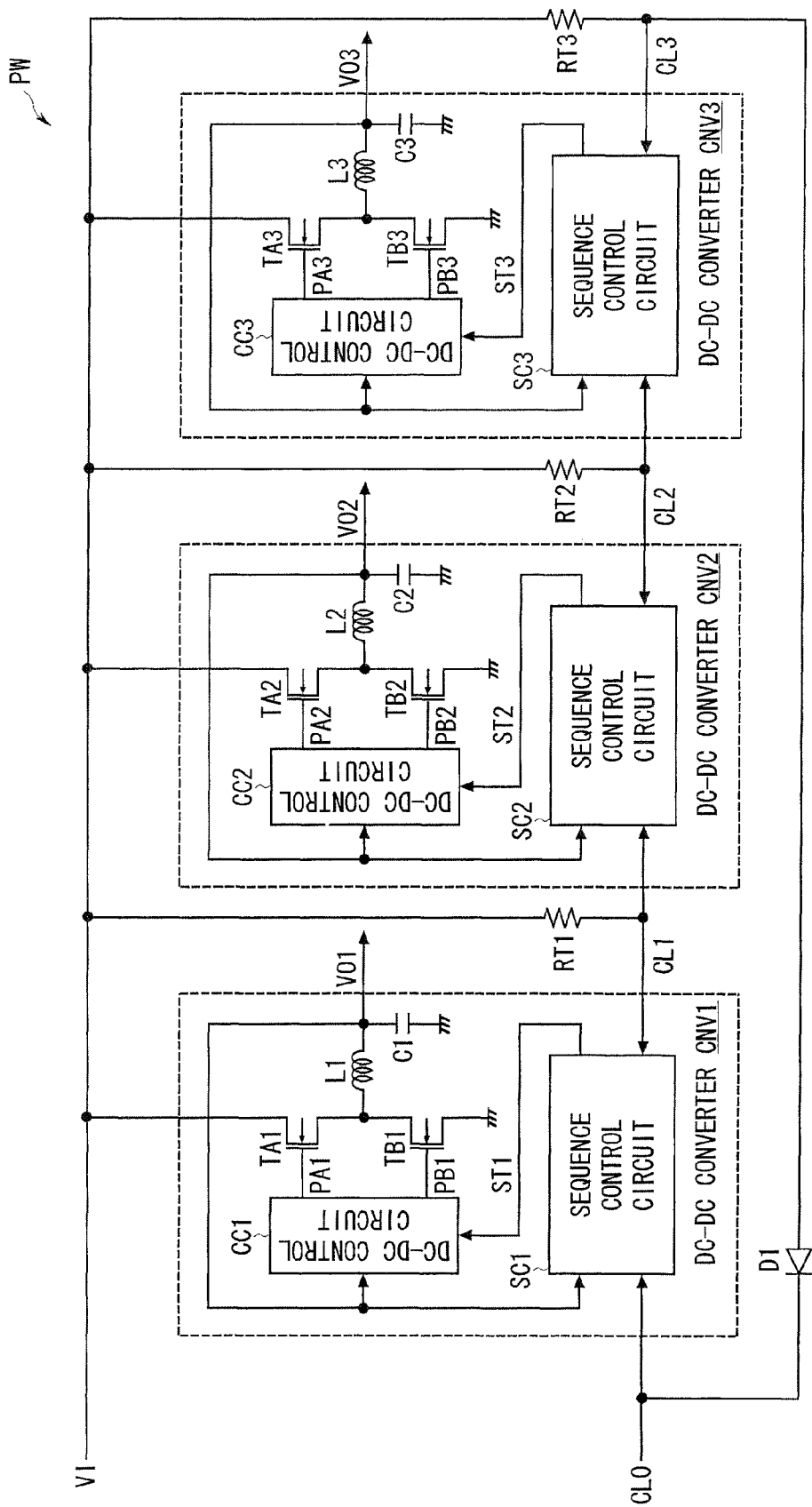
FIG. 6 is an explanatory diagram showing a first embodiment.

FIG. 6 shows a first embodiment. A power supply circuit PW of the first embodiment is constituted including DC-DC converters CNV1 to CNV3, pull-up resistors RT1 to RT3 and a diode D1. For example, the power supply circuit PW is embodied by a semiconductor device and is mounted in a portable electronics device.

A pull-up resistor RTn (n=1, 2, 3) is provided for pulling up a control signal line CLn and is connected between a supply line for an input voltage VI and the control signal line CLn. The diode D1 is provided for forcibly setting a control signal line CL3 to a low level when a falling transition of a control signal line CL0 occurs, and is connected between the control signal line CL0 and the control signal line CL3. Note that the control signal line CL0 is set to a high level when requesting a power-on to the power supply circuit PW, and is set to a low level when requesting a power-off to the power supply circuit PW.

A DC-DC converter CNVn is provided for generating an output voltage VOn from the input voltage VI, and is constituted including a main switching transistor TAn, a synchronous rectification transistor TBn, a choke coil Ln, a smoothing capacitor Cn, a DC-DC control circuit CCn and a sequence control circuit SCn. For example, a rated value for the output voltage VO1 is 5.0 V, a rated value for the output voltage VO2 is 3.0 V, and a rated value for the output voltage VO3 is 1.8 V.

The main switching transistor TAn and the synchronous rectification transistor TBn are connected in series between the supply line for the input voltage VI and a ground line. A control pin of the main switching transistor TAn receives a pulse signal PAn supplied from the DC-DC control circuit CCn. A control pin of the synchronous rectification transistor TBn receives a pulse signal PBn supplied from the DC-DC control circuit CCn. One end of the choke coil Ln is connected to a connection node between the main switching transistor TAn and the synchronous rectification transistor TBn. The other end of the choke coil Ln is connected to a supply line for the output voltage VOn. The smoothing capacitor Cn is provided for smoothing the output voltage VOn and is connected between the supply line for the output voltage VOn and the ground line.

When a start signal STn supplied from the sequence control circuit SCn is set to a high level, the DC-DC control circuit CCn generates, according to the output voltage VOn, the pulse signals PAn, PBn for controlling on/off of the main switching transistor TAn and the synchronous rectification transistor TBn. Note that since the control operations for the main switching transistor TAn and the synchronous rectification transistor TBn by the DC-DC control circuit CCn are publicly known, a detailed explanation thereof is omitted here.

The sequence control circuit SCn sets the start signal STn to a high level in response to a rising transition of the control signal line CLn-1, and stops driving of the control signal line CLn to a low level along with completion of rising of the output voltage VOn. Also, in response to a falling transition of the control signal line CLn, the sequence control circuit SCn sets the start signal STn to a low level and also starts driving of the control signal line CLn to a low level, and implements driving of the control signal line CLn-1 to a low level only for a predetermined time along with completion of falling of the output voltage VOn.

Figure 7:
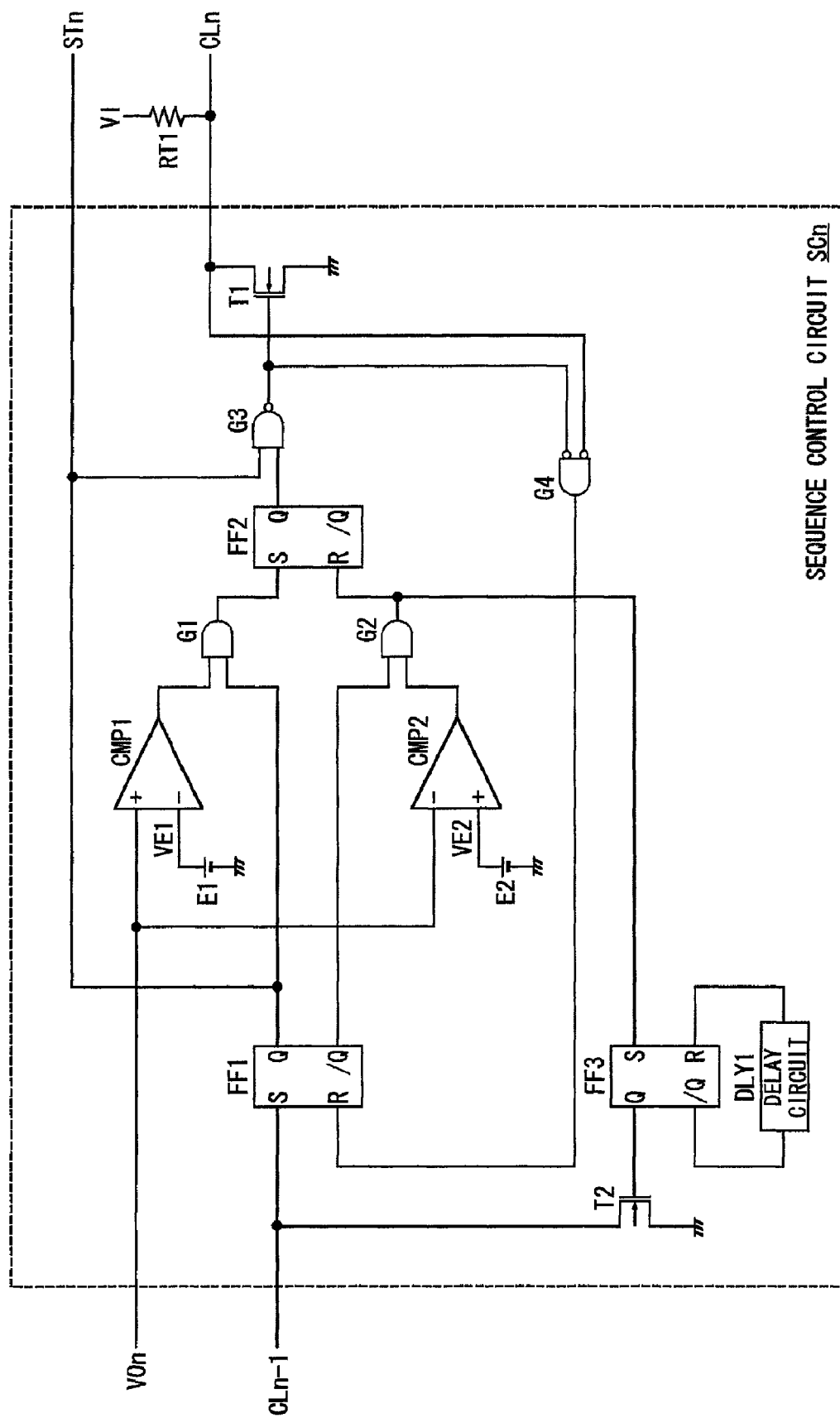
FIG. 7 is an explanatory diagram showing details of a sequence control circuit in the first embodiment.

FIG. 7 shows details of the sequence control circuit in the first embodiment. The sequence control circuit SCn is constituted including flop-flops FF1 to FF3, voltage generators E1, E2, voltage comparators CMP1, CMP2, gate circuits G1 to G4, transistors T1, T2 and a delay circuit DLY1. The flip-flop FF1 has a set pin S connected to the control signal line CLn-1 and a reset pin R connected to an output pin of the gate circuit G4. Therefore, an output signal of a non-inverting output pin Q of the flip-flop FF1 is set to a high level in response to a rising transition of the control signal line CLn-1, and is set to a low level in response to a rising transition of an output signal of the gate circuit G4. Also, an output signal of an inverting output pin /Q of the flip-flop FF1 is set to a low level in response to a rising transition of the control signal line CLn-1, and is set to a high level in response to a rising transition of the output signal of the gate circuit G4. Note that the output signal of the non-inverting output pin Q of the flip-flop FF1 is supplied as the start signal STn to the DC-DC control circuit CCn (FIG. 6).

The voltage generator E1 generates a reference voltage VE1. The voltage comparator CMP1 is provided for detecting completion of rising of the output voltage VOn. The voltage comparator CMP1 receives the output voltage VOn at a non-inverting input pin, and receives the reference voltage VE1 at an inverting input pin. Therefore, an output signal of the voltage comparator CMP1 is set to a high level when the output voltage VOn is higher than the reference voltage VE1, and is set to a low level when the output voltage VOn is lower than the reference voltage VE1. Note that since the rated values for the output voltages VO1 to VO3 are different, voltage values of the reference voltage VE1 in the sequence control circuits SC1 to SC3 are different correspondingly.

The voltage generator E2 generates a reference voltage VE2. The voltage comparator CMP2 is provided for detecting completion of falling of the output voltage VOn. The voltage comparator CMP2 receives the reference voltage VE2 at a non-inverting input pin, and receives the output voltage VOn at an inverting input pin. Therefore, an output signal of the voltage comparator CMP2 is set to a high level when the output voltage VOn is lower than the reference voltage VE2, and is set to a low level when the output voltage VOn is higher than the reference voltage VE2.

The gate circuit G1 sets an output signal to a high level when the output signal of the voltage comparator CMP1 is set to a high level and the output signal of the non-inverting output pin Q of the flip-flop FF1 is set to a high level, and sets the output signal to a low level under other conditions. The gate circuit G2 sets an output signal to a high level when the output signal of the voltage comparator CMP2 is set to a high level and the output signal of the inverting output pin /Q of the flip-flop FF1 is set to a high level, and sets the output signal to a low level under other conditions.

The flip-flop FF2 has a set pin S connected to an output pin of the gate circuit G1, and a reset pin R connected to an output pin of the gate circuit G2. Therefore, an output signal of a non-inverting output pin Q of the flip-flop FF2 is set to a high level in response to a rising transition of the output signal of the gate circuit G1, and is set to a low level in response to a rising transition of the output signal of the gate circuit G2. Also, an output signal of an inverting output pin /Q of the flip-flop FF2 is set to a low level in response to a rising transition of the output signal of the gate circuit G1, and is set to a high level in response to a rising transition of the output signal of the gate circuit G2.

The gate circuit G3 sets an output signal to a low level when the output signal of the non-inverting output pin Q of the flip-flop FF1 is set to a high level and the output signal of the non-inverting output pin Q of the flip-flop FF2 is set to a high level, and sets the output signal to a high level under other conditions. The transistor T1 is constituted of an n-type transistor and is connected between the control signal line CLn and the ground line. A control pin of the transistor T1 receives the output signal of the gate circuit G3.

The gate circuit G4 sets an output signal to a high level when the output signal of the gate circuit G3 is set to a low level and the control signal line CLn is set to a low level, and sets the output signal to a low level under other conditions. The delay circuit DLY1 is constituted by connecting an odd number of inverters in series for example, and delays an output signal of an inverting output pin /Q of the flip-flop FF3 for a predetermined time and inverts and outputs this signal.

The flip-flop FF3 has a set pin S connected to the output pin of the gate circuit G2 and a reset pin R connected to an output pin of the delay circuit DLY1. Therefore, an output signal of a non-inverting output pin Q of the flip-flop FF3 is set to a high level in response to a rising transition of the output signal of the gate circuit G2, and is set to a low level in response to a rising transition of an output signal of the delay circuit DLY1. Also, an output signal of the inverting output pin /Q of the flip-flop FF3 is set to a low level in response to a rising transition of the output signal of the gate circuit G2, and is set to a high level in response to a rising transition of the output signal of the delay circuit DLY1. The transistor T2 is constituted of an n-type transistor and is connected between the control signal line CLn-1 and the ground line. A control pin of the transistor T2 receives the output signal of the non-inverting output pin Q of the flip-flop FF3.

In the sequence control circuit SCn with such a structure, the flip-flop FF1 functions as a circuit for determining whether there is a start request/stop request to the DC-DC converter CNVn or not, and the flip-flop FF2 functions as a circuit for determining an implementation status of a start operation/stop operation of the DC-DC converter CNVn. When the output signal of the non-inverting output pin Q of the flip-flop FF1 is set to a low level and the output signal of the non-inverting output pin Q of the flip-flop FF2 is set to a low level, the DC-DC converter CNVn is in a state that a stop operation is completed. When the output signal of the non-inverting output pin Q of the flip-flop FF1 is set to a high level and the output signal of the non-inverting output pin Q of the flip-flop FF2 is set to a low level, the DC-DC converter CNVn is in a state that a start operation is implemented. When the output signal of the non-inverting output pin Q of the flip-flop FF1 is set to a high level and the output signal of the non-inverting output pin Q of the flip-flop FF2 is set to a high level, the DC-DC converter CNVn is in a state that a start operation is completed. When the output signal of the non-inverting output pin Q of the flip-flop FF1 is set to a low level and the output signal of the non-inverting output pin Q of the flip-flop FF2 is set to a high level, the DC-DC converter CNVn is in a state that a stop operation is implemented.

Figure 8:
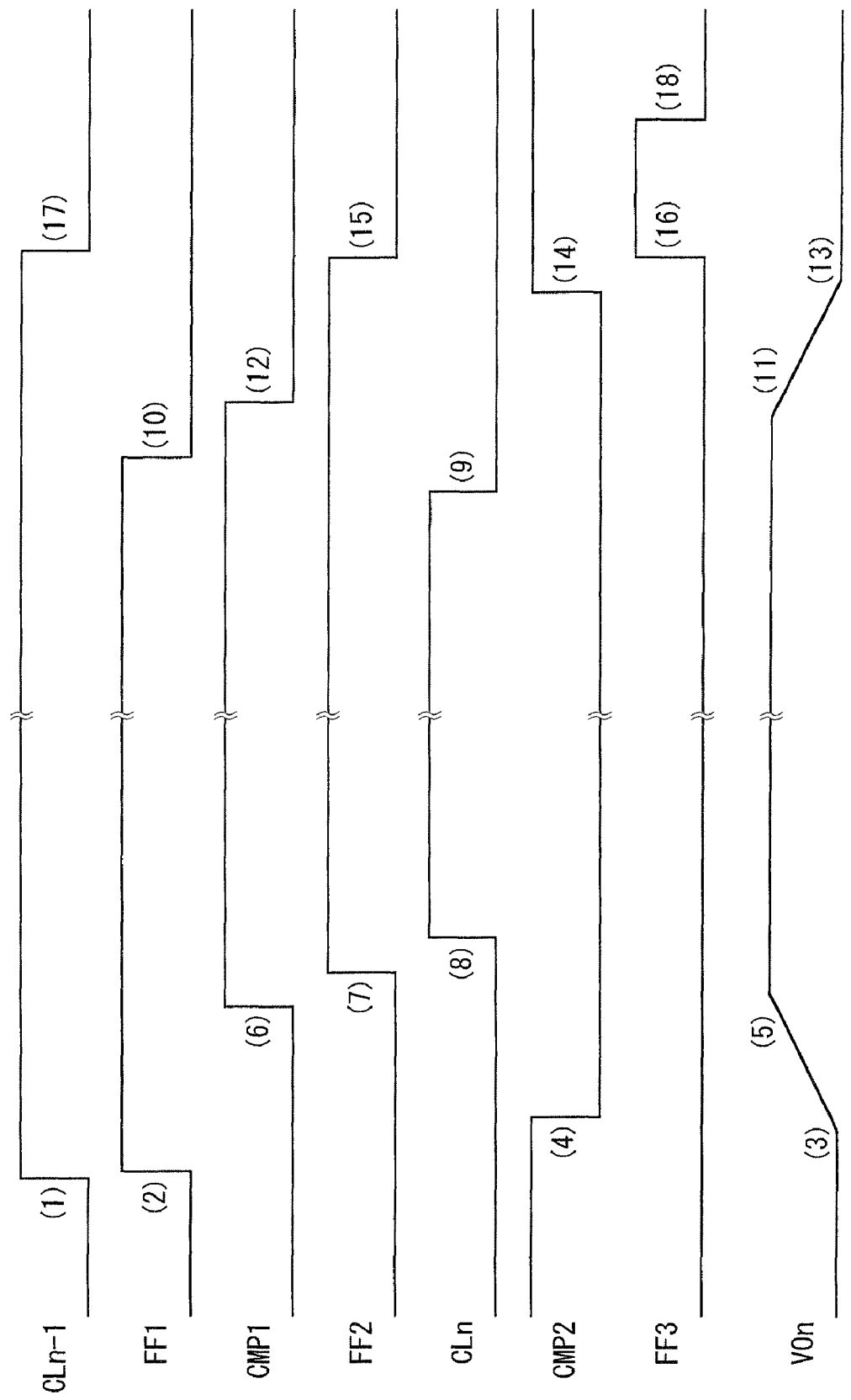
FIG. 8 is an explanatory chart showing the operation of the sequence control circuit of FIG. 7.

FIG. 8 shows the operation of the sequence control circuit of FIG. 7. In the sequence control circuit SCn, when the control signal line CLn-1 changes from a low level to a high level (FIG. 8 (1)), the flip-flop FF1 turns to a set state, and the output signal of the non-inverting output pin Q of the flip-flop FF1 changes from a low level to a high level (FIG. 8 (2)).

Since the output signal of the non-inverting output pin Q of the flip-flop FF1 is supplied as the start signal STn to the DC-DC control circuit CCn, control operations of the main switching transistor TAn and the synchronous rectification transistor TBn by the DC-DC control circuit CCn are started. Accordingly, a start operation of the DC-DC converter CNVn is started and the output voltage VOn starts to rise from 0 (zero) V.

When the output voltage VOn rises and becomes higher than the reference voltage VE2 (FIG. 8 (3)), the output signal of the voltage comparator CMP2 changes from a high level to a low level (FIG. 8 (4)). When the output voltage VOn rises further and becomes higher than the reference voltage VE1 (FIG. 8 (5)), the output signal of the voltage comparator CMP1 changes from a low level to a high level (FIG. 8 (6)). At this time, since the output signal of the non-inverting output pin Q of the flip-flop FF1 is set to the high level, the output signal of the gate circuit G1 changes from a low level to a high level. Accordingly, the flip-flop FF2 turns to a set state, and the output signal of the non-inverting output pin Q of the flip-flop FF2 changes from a low level to a high level (FIG. 8 (7)). At this time, since the output signal of the non-inverting output pin Q of the flip-flop FF1 is set to the high level, the output signal of the gate circuit G3 changes from a high level to a low level. Accordingly, the transistor T turns off and driving of the control signal line CLn to a low level by the DC-DC converter CNVn (sequence control circuit SCn) is stopped, and the control signal line CLn changes from a low level to a high level by the operation of the pull-up transistor RTn (FIG. 8 (8)).

Also, when the control signal line CLn changes from a high level to a low level (FIG. 8 (9)), the output signal of the gate circuit G4 changes from a low level to a high level since the output signal of the gate circuit G3 is set to the low level. Accordingly, the flip-flop FF1 turns to a reset state, and the output signal of the non-inverting output pin Q of the flip-flop FF1 changes from the high level to a low level (FIG. 8 (10)). Since the output signal of the non-inverting output pin Q of the flip-flop FF1 is supplied as the start signal STn to the DC-DC control circuit CCn, the control operations of the main switching transistor TAn and the synchronous rectification transistor TBn by the DC-DC control circuit CCn are stopped. Accordingly, a stop operation of the DC-DC converter CNVn is started and the output voltage VOn starts to fall from the rated value. Also, when the output signal of the non-inverting output pin Q of the flip-flop FF1 changes from the high level to the low level, the output signal of the gate circuit G3 changes from the low level to a high level. Accordingly, the transistor T1 turns on and driving of the control signal line CLn to a low level by the DC-DC converter CNVn (sequence control circuit SCn) is started.

When the output voltage VOn falls and becomes lower than the reference voltage VE1 (FIG. 8 (11)), the output signal of the voltage comparator CMP1 changes from the high level to a low level (FIG. 8 (12)). When the output voltage VOn falls further and becomes lower than the reference voltage VE2 (FIG. 8 (13)), the output signal of the voltage comparator CMP2 changes from the low level to a high level (FIG. 8 (14)). At this time, since the output signal of the inverting output pin /Q of the flip-flop FF1 is set to the high level, the output signal of the gate circuit G2 changes from a low level to a high level. Accordingly, the flip-flop FF2 turns to a reset state, and the output signal of the non-inverting output pin Q of the flip-flop FF2 changes from the high level to a low level (FIG. 8 (15)). Also, when the output signal of the gate circuit G2 changes from the low level to the high level, the flip-flop FF3 turns to a set state, and the output signal of the non-inverting output pin Q of the flip-flop FF3 changes from a low level to a high level (FIG. 8 (16)). Accordingly, the transistor T2 turns on and driving of the control signal line CLn-1 to a low level by the DC-DC converter CNVn (sequence control circuit SCn) is started, and the control signal line CLn-1 changes from the high level to a low level (FIG. 8 (17)). When a predetermined time (delay time of the delay circuit DLY1) passes after the output signal of the inverting output pin /Q of the flip-flop FF3 changes from a high level to a low level, the output signal of the delay circuit DLY1 changes from a low level to a high level. Accordingly, the flip-flop FF3 becomes a reset state, and the output signal of the non-inverting output pin Q of the flip-flop FF3 changes from the high level to a low level (FIG. 8(18)). Accordingly, the transistor T2 turns off and the driving of the control signal line CLn-1 to the low level by the DC-DC converter CNVn (sequence control circuit SCn) is stopped.

In the power supply circuit PW with the structure as described above, when the control signal line CL0 changes from a low level to a high level (when a power-on is requested to the power supply circuit PW), the DC-DC converter CNV1 commences a start operation (making the output voltage VO1 rise). When the start operation of the DC-DC converter CNV1 completes, the DC-DC converter CNV1 stops driving of the control signal line CL1 to a low level so as to notify the completion of the start operation to the DC-DC converter CNV2. Along with this, the control signal line CL1 changes from the low level to a high level by the operation of the pull-up resistor RT1.

When the control signal line CL1 changes from the low level to the high level, the DC-DC converter CNV2 commences a start operation (making the output voltage VO2 rise). When the start operation of the DC-DC converter CNV2 completes, the DC-DC converter CNV2 stops driving of the control signal line CL2 to a low level so as to notify the completion of the start operation to the DC-DC converter CNV3. Along with this, the control signal line CL2 changes from the low level to a high level by the operation of the pull-up resistor RT2.

When the control signal line CL2 changes from the low level to the high level, the DC-DC converter CNV3 commences a start operation (making the output voltage VO3 rise). When the start operation of the DC-DC converter CNV3 completes, the DC-DC converter CNV3 stops driving of the control signal line CL3 to a low level. Along with this, the control signal line CL3 changes from the low level to a high level by the operation of the pull-up resistor RT3. Thus, when a power-on is requested to the power supply circuit PW, the DC-DC converters CNV1 to CNV3 are started in ascending sequence (sequence of DC-DC converters CNV1, CNV2, CNV3).

Also, when the control signal line CL0 changes from a high level to a low level (when a power-off is requested to the power supply circuit PW), the control signal line CL3 changes from a high level to a low level by the operation of the diode D1. When the control signal line CL3 changes from the high level to the low level, the DC-DC converter CNV3 commences a stop operation (making the output voltage VO3 fall) and also starts driving of the control signal line CL3 to a low level. When the stop operation of the DC-DC converter CNV3 completes, the DC-DC converter CNV3 implements driving of the control signal line CL2 to a low level only for a predetermined time so as to notify the completion of the start operation to the DC-DC converter CNV2. Accordingly, the control signal line CL2 changes from a high level to the low level.

When the control signal line CL2 changes from the high level to the low level, the DC-DC converter CNV2 commences a stop operation (making the output voltage VO2 fall) and also starts driving of the control signal line CL2 to a low level. When the stop operation of the DC-DC converter CNV2 completes, the DC-DC converter CNV2 implements driving of the control signal lien CL1 to a low level for a predetermined time so as to notify the completion of the start operation to the DC-DC converter CNV1. Accordingly, the control signal line CL1 changes from a high level to a low level.

When the control signal line CL1 changes from the high level to the low level, the DC-DC converter CNV1 commences a stop operation (making the output voltage VO1 fall) and also starts driving of the control signal line CL1 to a low level. When the stop operation of the DC-DC converter CNV1 completes, the DC-DC converter CNV1 implements driving of the control signal line CL0 to a low level only for a predetermined time. Thus, when a power off is requested to the power supply circuit PW, the DC-DC converters CNV1 to CNV3 are stopped in descending sequence (sequence of the DC-DC converters CNV3, CNV2, CNV1).

Thus, in the first embodiment, by making the control signal line for controlling a start sequence and the control signal line for controlling a stop sequence common among the DC-DC converters CNV1 to CNV3, the start sequence and the stop sequence among the DC-DC converters CNV1 to CNV3 can be reversed using a small number of control signal lines. In other words, a desired start sequence and a desired stop sequence for the DC-DC converters CNV1 to CNV3 can be realized by a simple structure.

Figure 9:
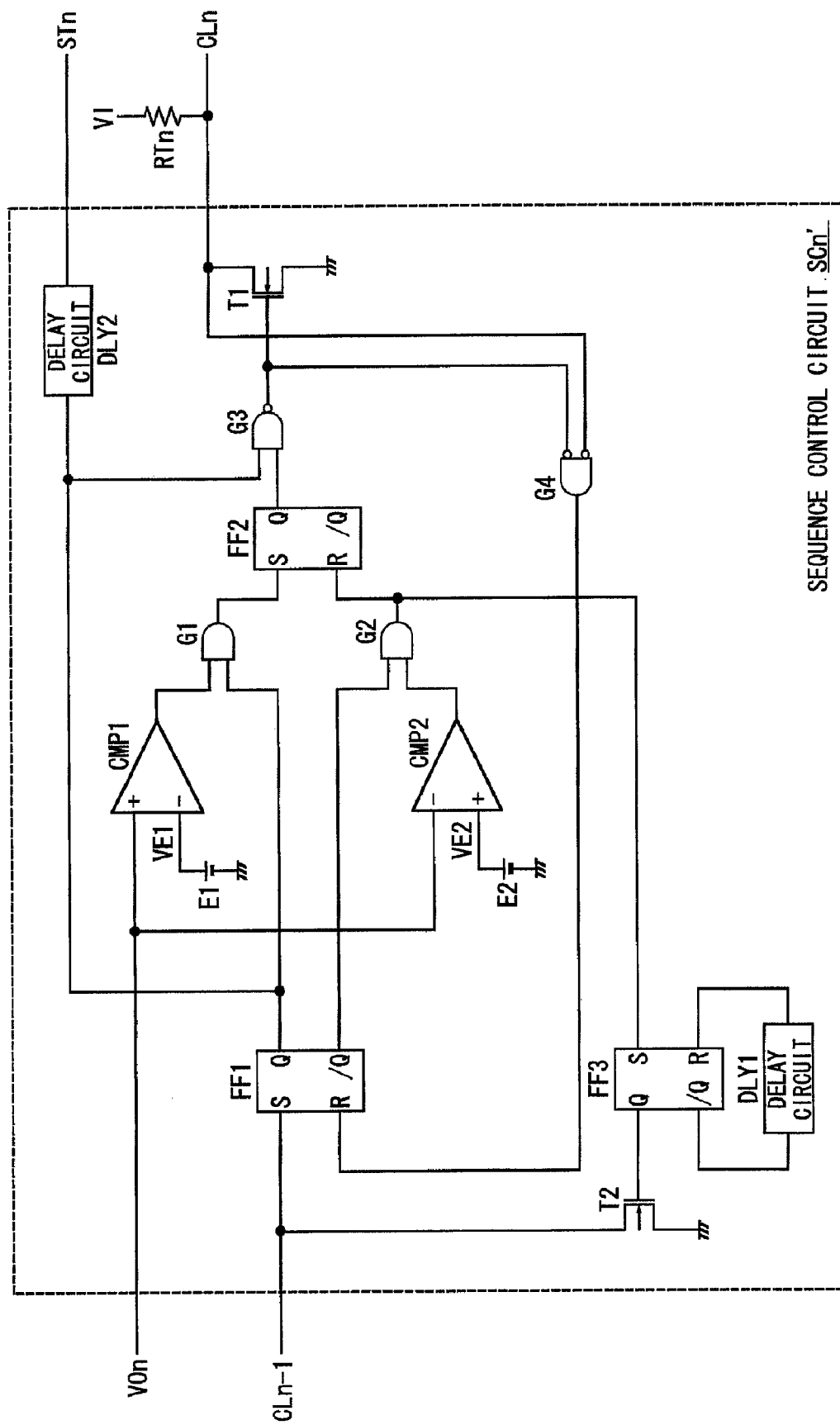
FIG. 9 is an explanatory diagram showing a second embodiment.

FIG. 9 shows a second embodiment. Note that for explaining the second embodiment, the same reference numerals as those used in the first embodiment are used for the same elements as those explained in the first embodiment, and detailed explanations thereof are omitted. A power supply circuit of the second embodiment is the same as the power supply circuit PW (FIG. 6) of the first embodiment except that the sequence control circuit SCn (n=1, 2, 3) is replaced with a sequence control circuit SCn'.

The sequence control circuit SCn' of the second embodiment is the same as the sequence control circuit SCn (FIG. 7) of the first embodiment except that a delay circuit DLY2 is provided. The delay circuit DLY2 is constituted by connecting an even number of inverters in series for example, and delays the output signal of the non-inverting output pin Q of the flip-flop FF1 for a predetermined time and outputs this signal as a start signal STn. Note that a delay time of the delay circuit DLY2 (the number of inverters constituting the delay circuit DLY2) may be different as necessary in each of the sequence control circuit SC1' to SC3'.

Figure 10:
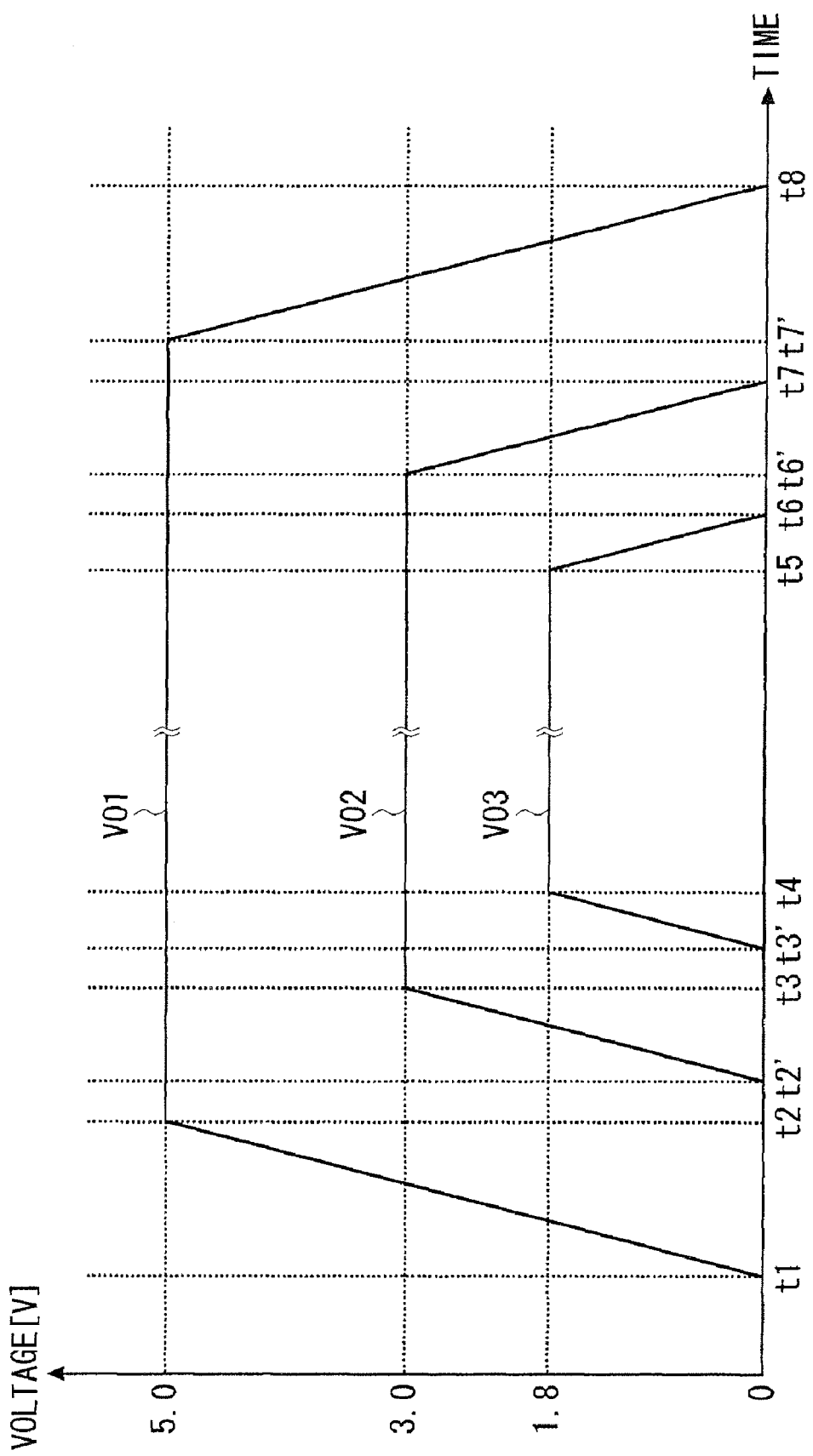
FIG. 10 is an explanatory chart showing an overview of rising/falling of output voltages in the second embodiment.

FIG. 10 shows an overview of rising/falling of the output voltages in the second embodiment. In the power supply circuit of the second embodiment, the delay circuit DLY2 is provided in each of the sequence control circuit SC1' to SC3'. Thus, rising of the output voltage VO1 is started at time t1, and when the rising of the output voltage VO1 completes at time t2, rising of the output voltage VO2 is started at time t2' at which a certain time (corresponding to the delay time of the delay circuit DLY2) has passed from the time t2. Then, when the rising of the output voltage VO2 completes at time t3, rising of the output voltage VO3 is started at time t3' at which a certain time has passed from the time t3, and the rising of the output voltage VO3 completes at time t4.

Similarly, falling of the output voltage VO3 is started at time t5, and when the falling of the output voltage VO3 completes at time t6, falling of the output voltage VO2 is started at time t6' at which a certain time (corresponding to the delay time of the delay circuit DLY2) has passed from the time t6. Then, when the falling of the output voltage VO2 completes at time t7, falling of the output voltage VO1 is started at time t7' at which a certain time has passed from the time t7, and the falling of the output voltage VO1 completes at time t8.

Thus, a risk that latch-up occurs in the semiconductor device using the output voltages VO1 to VO3 in an electronics device and leads to burn-out can be avoided more reliably, as compared to the case that, as in the first embodiment, rising of the output voltage VO2 (VO3) is started immediately after rising of the output voltage VO1 (VO2) completes, and falling of the output voltage VO2 (VO1) is started immediately after falling of the output voltage VO3 (VO2) completes.

Note that in the first and the second embodiments, an example in which a power supply circuit is constituted including three DC-DC converters is explained. It is needless to mention that the power supply circuit may be constituted including two, four or more DC-DC converters. Also, in the first and the second embodiments, an example in which the power supply circuit is embodied by a semiconductor device is explained. For example, the power supply circuit may be embodied by a module (printed-circuit board or the like.)

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A power supply circuit comprising a plurality of DC-DC converters, wherein:
    the plurality of DC-DC converters are cascade-connected via a plurality of control signal lines which are used in common for start sequence control and stop sequence control; and
    each of the plurality of DC-DC converters comprises a sequence control circuit which commences a start operation along with activation of a control signal line on a previous stage side and activates a control signal line on a subsequent stage side along with completion of the start operation, and commences a stop operation along with deactivation of the control signal line on the subsequent stage side and deactivates the control signal line on the previous stage side along with completion of the stop operation.

2. The power supply circuit according to claim 1, further comprising
    a deactivation circuit which deactivates a control signal line on a subsequent stage side in a DC-DC converter at a final stage along with deactivation of a control signal line on a previous stage side in a DC-DC converter at a first stage, wherein
    the control signal line on the previous stage side in the DC-DC converter at the first stage is activated when a power-on is requested to the power supply circuit and is deactivated when a power-off is requested to the power supply circuit.

3. The power supply circuit according to claim 1, wherein
    the sequence control circuit commences a start operation after a predetermined time has passed from activation of the control signal line on the previous stage side, and commences a stop operation after a predetermined time has passed from deactivation of the control signal line on the subsequent stage side.

4. The power supply circuit according to claim 1, wherein the power supply circuit is constituted using a semiconductor device.

5. A power supply control circuit applied to a power supply circuit which comprises a plurality of DC-DC converters, which are cascade-connected via a plurality of control signal lines which are used in common for start sequence control and stop sequence control, the power supply control circuit comprising
a sequence control circuit which commences, for each of the plurality of DC-DC converters, a start operation along with activation of a control signal line on a previous stage side and activates a control signal line on a subsequent stage side along with completion of the start operation, and commences a stop operation along with deactivation of the control signal line on the subsequent stage side and deactivates the control signal line on the previous stage side along with completion of the stop operation.

6. The power supply control circuit according to claim 5, further comprising:
a deactivation circuit which deactivates a control signal line on a subsequent stage side in a DC-DC converter at a final stage along with deactivation of a control signal line on a previous stage side in a DC-DC converter at a first stage, wherein
the control signal line on the previous stage side in the DC-DC converter at the first stage is activated when a power-on is requested to the power supply circuit and is deactivated when a power-off is requested to the power supply circuit.

7. The power supply control circuit according to claim 5, wherein
the sequence control circuit commences a start operation after a predetermined time has passed from activation of the control signal line on the previous stage side, and commences a stop operation after a predetermined time has passed from deactivation of the control signal line on the subsequent stage side.

8. A power supply control method applied to a power supply circuit which comprises a plurality of DC-DC converters, comprising:
cascade-connecting the plurality of DC-DC converters via a plurality of control signal lines which are used in common for start sequence control and stop sequence control; and
for each of the plurality of DC-DC converters, commencing a start operation along with activation of a control signal line on a previous stage side and activating a control signal line on a subsequent stage side along with completion of the start operation, and commencing a stop operation along with deactivation of the control signal line on the subsequent stage side and deactivating the control signal line on the previous stage side along with completion of the stop operation.

9. The power supply control method according to claim 8, wherein:
the control signal line on a previous stage side in a DC-DC converter at a first stage is activated when a power-on is requested to the power supply circuit and is deactivated when a power-off is requested to the power supply circuit; and
a control signal line on a subsequent stage side in a DC-DC converter at a final stage is deactivated along with deactivation of the control signal line on the previous stage side in the DC-DC converter at the first stage.

10. The power supply control method according to claim 8, wherein
for each of the plurality of DC-DC converters, a start operation is commenced after a predetermined time has passed from activation of the control signal line on the previous stage side, and a stop operation is commenced after a predetermined time has passed from deactivation of the control signal line on the subsequent stage side.

* * * * *